United States Patent
Haramaty et al.

(10) Patent No.: US 9,667,441 B2
(45) Date of Patent: May 30, 2017

(54) UNITING FDB LOOKUPS FOR ENCAPSULATED PACKETS

(71) Applicant: MELLANOX TECHNOLOGIES LTD., Yokneam (IL)

(72) Inventors: Zachy Haramaty, Hemed (IL); Ran Shani, Hod Hasharon (IL); Oded Wertheim, Zichron Yaakov (IL)

(73) Assignee: MELLANOX TECHNOLOGIES LTD., Yokneam (IL)

( * ) Notice: Subject to any disclaimer, the term of this patent is extended or adjusted under 35 U.S.C. 154(b) by 316 days.

(21) Appl. No.: 13/845,182

(22) Filed: Mar. 18, 2013

(65) Prior Publication Data

US 2014/0269732 A1  Sep. 18, 2014

(51) Int. Cl.
*H04L 12/46* (2006.01)

(52) U.S. Cl.
CPC ........ *H04L 12/465* (2013.01); *H04L 12/4654* (2013.01); *H04L 12/4658* (2013.01)

(58) Field of Classification Search
None
See application file for complete search history.

(56) References Cited

U.S. PATENT DOCUMENTS

| | | | |
|---|---|---|---|
| 6,438,130 B1 | 8/2002 | Kagan et al. | |
| 6,529,507 B1 | 3/2003 | O'Malley et al. | |
| 8,416,790 B1 * | 4/2013 | Busch et al. | 370/401 |
| 2010/0135302 A1 * | 6/2010 | Ra | H04L 12/413 370/392 |
| 2010/0142537 A1 * | 6/2010 | Lee et al. | 370/395.53 |
| 2010/0158017 A1 * | 6/2010 | Casey | 370/395.53 |
| 2012/0008491 A1 * | 1/2012 | Shimada | 370/218 |
| 2012/0243539 A1 * | 9/2012 | Keesara | 370/392 |
| 2012/0243544 A1 * | 9/2012 | Keesara | 370/395.53 |

FOREIGN PATENT DOCUMENTS

| | | |
|---|---|---|
| EP | 1863234 | 12/2007 |
| EP | 2016715 | 1/2009 |
| EP | 2112787 | 1/2011 |
| WO | 2007/135539 | 11/2007 |

* cited by examiner

Primary Examiner — Hicham Foud

(74) Attorney, Agent, or Firm — Mark M. Friedman

(57) ABSTRACT

A method of communications at an encapsulating bridge includes receiving a packet having an unencapsulated-DA (destination address) and an associated encapsulation identifier. The unencapsulated-DA and the associated encapsulation identifier are used to determine a TxPort-unencapsulated network (unencapsulated network side transmit port) or an encapsulated-DA for the packet. This method reduces latency of processing by reducing lookups, thereby also increasing transmission bandwidth of the communications network. The invention also facilitates embodiments with reduced memory and processing requirements, as compared to conventional implementations. This method is particularly useful for MAC-in-MAC encapsulation.

11 Claims, 9 Drawing Sheets

| | Figure 1B | FOB standard model LOCATION-FUNCTION | | | Notes |
|---|---|---|---|---|---|
| 301 | 200,201,204 | From CNP: | | | |
| 302 | 221 | I-Comp-X21 | Lookup | S-VID → I-SID | |
| 303 | 220 | B-Comp-20 | Lookup | I-SID → B-VID | |
| 304 | 292 | I-Comp-X21 | Lookup | C-DA→ TxPort-CNP-I-Comp-X21,or B-DA | |
| 305 | 298 | B-Comp-20 | Lookup | B-DA, B-VID → I-Comp-X22,TxPort-PNP | Only if Line 304 results with a B-DA |
| 306 | 295 | I-Comp-X22 | Lookup | C-DA→ TxPort-CNP-I-Comp-X22 | Only if Line 305 results with I-Comp-X22 |
| 307 | 2928 | I-Comp-X21 | Learn | C-SA → RxPort-CNP-I-Comp-X21 | |
| 308 | 2958 | I-Comp-X22 | Learn | C-SA → B-SA-I-Comp-X22 | Only if Line 305 results with I-Comp-X22 |
| 309 | | From PNP: | | | |
| 310 | | B-Comp-20 | Lookup | B-DA, B-VID →I-Comp-X,TxPort-PNP | |
| 311 | | I-Comp-X21 | Lookup | C-DA→ TxPort-CNP-I-Comp-X21 | Only if B-DA == I-Comp-X21 |
| 312 | | I-Comp-X22 | Lookup | C-DA→TxPort-CNP-I-Comp-X22 | Only if B-DA == I-Comp-X22 |
| 313 | | I-Comp-X21 | Learn | C-SA→ B-SA | Only if B-DA == I-Comp-X21 |
| 314 | | I-Comp-X22 | Learn | C-SA→ B-SA | Only if B-DA == I-Comp-X22 |
| 315 | | B-Comp-20 | Learn | B-SA→ RxPort-PNP | |

PRIOR ART

FIGURE 1C

|  | Figure 2A | FOB standard model | | | Notes |
|---|---|---|---|---|---|
| 501 | 200, 201 204 | From CNP: | | | |
| 502 | 821 | | Lookup | I-Comp-X21, S-VID → I-SID, B-VID | |
| 503 | 492 | I-Comp-X2 | Lookup | C-DA, I-SID → TxPort-CNP or B-DA | |
| 505 | 298 | B-Comp-20 | Lookup | B-DA, B-VID → TxPort-PNP | Only if Line 503 results with a B-DA |
| 507 | 492B | I-Comp-X2 | Learn | C-SA, I-SID → RxPort-CNP | |
| 509 | | From PNP: | | | |
| 510 | | B-Comp-20 | Lookup | B-DA, B-VID → I-Comp-X2 or TxPort-PNP | |
| 511 | | I-Comp-X2 | Lookup | C-DA, I-SID → TxPort-CNP | Only if B-DA == I-Comp-X |
| 513 | | I-Comp-X2 | Learn | C-SA, I-SID → B-SA | Only if B-DA == I-Comp-X |
| 515 | | B-Comp-20 | Learn | B-SA → RxPort-PNP | |

Figure 2B

|     | Figure 3A | FOB standard model LOCATION-FUNCTION | | | Notes |
|-----|-----------|-------------|--------|------------------------------------------|--------------|
| 701 | 200, 201 204 | From CNP: | | | |
| 702 | 821 | I-Comp-X21 | Lookup | I-Comp-X21, S-VID → I-SID, B-VID | |
| 704 | 692 | I-Comp-X2 | Lookup | C-DA, I-SID → TxPort-CNP or TxPort-PNP, B-DA | |
| 707 | 6923 | I-Comp-X2 | Learn | C-SA, I-SID → RxPort-CNP | |
| 709 | | From PNP: | | | |
| 710 | | B-Comp-20 | Lookup | B-DA, B-VID → I-Comp-X2 or TxPort-PNP | |
| 711 | | I-Comp-X2 | Lookup | C-DA, I-SID → TxPort-CNP | B-DA == I-Comp-X |
| 713 | | I-Comp-X2 | Learn | C-SA, I-SID → B-SA, RxPort-PNP | B-DA == I-Comp-X |
| 715 | | B-Comp-20 | Learn | B-SA → RxPort-PNP | |

FIGURE 3B

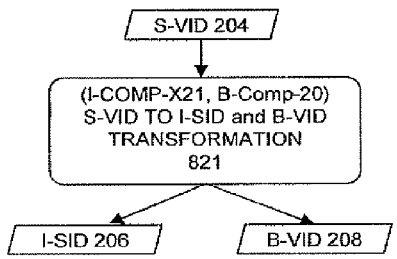

FIGURE 4A

|     | Figure 4A | FOB standard model LOCATION-FUNCTION | | | Notes |
|-----|-----------|-------------|--------|------------------------------------------|--------------|
| 801 | 200, 201 204 | From CNP: | | | |
| 802 | 821 | I-Comp-X21 | Lookup | I-Comp-X21, S-VID → I-SID, B-VID | |

FIGURE 4B

UNITING FDB LOOKUPS FOR ENCAPSULATED PACKETS

FIELD OF THE INVENTION

The present invention generally relates to communications, and in particular, it concerns improving performance of MAC-in-MAC (PBB) communications on IEEE 802.1 style networks.

BACKGROUND OF THE INVENTION

The IEEE 802.1Q (previous 802.1ah) standard describes the details of mechanisms used in this document, specifically using the I-Component (I-Comp) and the B-Component (B-Comp) for communications on a PBBN (Provider Backbone Bridged Network). Conventional implementations of I-Comp and B-Comp on a BEB (Backbone Edge Bridge) as part of a PBBN designate specific inputs, processing, and outputs for the I-Comp and B-Comp.

FIG. 5 is an example of a PBBN, equivalent to FIG. 26-1 from the IEEE Standard 802.1Q-2011. Components and functions on a PBBN are described in detail in the referred specifications, will be known to one skilled in the art, and will not be repeated in the current description.

The current growth and increase in demand for communications is well known in the world today. Systems and methods for providing additional communications (bandwidth) and/or increasing the bandwidth of legacy (already installed) communications channels are in great demand.

There is therefore a need to provide increased communications, including faster transmission rates, decreased latency of processing, and increased transmission bandwidth.

SUMMARY

According to the teachings of the present embodiment there is provided a method of communications at an encapsulating bridge including the steps of: receiving a packet having an unencapsulated-DA (destination address) and an associated encapsulation identifier; and determining, based on the unencapsulated-DA and the associated encapsulation identifier, a TxPort-unencapsulated network (unencapsulated network side transmit port) or an encapsulated-DA for the packet.

In an optional embodiment, the step of determining is done at least in part via lookups to a FDB (forwarding/filtering database). In another optional embodiment, the step of determining is done via less than three lookups. In another optional embodiment, the step of determining is done via less than two lookups.

In another optional embodiment, the step of determining further includes determining a TxPort-encapsulated network (encapsulated network port side transmit port) for the packet. In another optional embodiment, the step of determining is done via less than two lookups.

In an optional embodiment, the packet is received from an unencapsulated network port and the encapsulating bridge is on an encapsulated network. In another optional embodiment, the packet has a virtual network identifier, and the associated encapsulation identifier is determined based on the virtual network identifier. In another optional embodiment, the step of determining includes determining an encapsulated virtual network identifier from the virtual network identifier.

In an optional embodiment, the method includes a step of: learning, based on an unencapsulated source address of the packet and the associated encapsulation identifier, an RxPort-unencapsulated network (unencapsulated network port side receive port) for the packet. Note, this is also for a different unencapsulated network, such as for a different I-Comp.

In an optional embodiment, the receiving is done at an I-Comp (service instance [I] component). In another optional embodiment, the associated encapsulation identifier is generated from a virtual network identifier.

In an optional embodiment, the encapsulating bridge is a BEB (backbone edge bridge); the unencapsulated-DA is a C-DA (customer destination address); the associated encapsulation identifier is an I-SID (backbone service instance identifier); the virtual network identifier is an S-VID (service virtual local area network [VLAN] identifier); the TxPort-unencapsulated network is a TxPort-CNP (customer network port [CNP] side transmit port); the encapsulated-DA is a B-DA (backbone destination address); the TxPort-encapsulated network is a TxPort-PNP (provider network port [PNP] side transmit port); the unencapsulated network port is a CNP (customer network port); the encapsulated network is a PBBN (provider backbone bridged network); the encapsulated virtual network identifier is a B-VID (backbone VLAN identifier); the unencapsulated source address is a C-SA (customer source address); the RxPort-unencapsulated network is an RxPort-CNP (customer network port [CNP] side receive port); and encapsulation is MAC-in-MAC encapsulation.

According to the teachings of the present embodiment there is provided a system for communications including: a processing system on an encapsulating bridge, the processing system containing one or more processing modules and configured to: receive a packet having a unencapsulated-DA and an associated encapsulation identifier; and determine, based on the unencapsulated-DA and the associated encapsulation identifier, a TxPort-unencapsulated network or an encapsulated-DA for the packet.

In an optional embodiment, the system includes a FDB (forwarding/filtering database) processing module and wherein the processing system is configured to determine at least in part via lookups to the FDB. In another optional embodiment, the processing system is configured to determine in less than three lookups. In another optional embodiment, the processing system is configured to determine in less than two lookups.

In another optional embodiment, the processing system is further configured to determine a TxPort-encapsulated network for the packet. In another optional embodiment, the processing system is configured to determine in less than two lookups.

In an optional embodiment, the packet is received from an unencapsulated network port and the processing system is part of an encapsulating bridge on an encapsulated network. In another optional embodiment, the packet has a virtual network identifier, and the processing system is further configured with a processing module to determine the associated encapsulation identifier based on the virtual network identifier. In another optional embodiment, the processing system is further configured to: determine an encapsulated virtual network identifier from the virtual network identifier.

In an optional embodiment, the system is further configured to learn, based on an unencapsulated source address of the packet and the associated encapsulation identifier, an RxPort-unencapsulated network for the packet. In an optional embodiment, at least a portion of the processing modules are configured on an I-Comp of the encapsulating bridge.

According to the teachings of the present embodiment there is provided a computer-readable storage medium having embedded thereon computer-readable code for communications, the computer-readable code including program code for: determining, based on an unencapsulated-DA and an associated encapsulation identifier of a received packet, a TxPort-unencapsulated network or an encapsulated-DA for the packet, wherein the determining is done via less than three lookups to a FDB.

In an optional embodiment, the program code is further configured to determine a TxPort-encapsulated network for the packet. In another optional embodiment, the program code is further configured to learn, based on an unencapsulated source address of the packet and the associated encapsulation identifier, an RxPort-unencapsulated network for the packet.

According to the teachings of the present embodiment there is provided a computer-readable storage medium having embedded thereon computer-readable code for database storage and retrieval, the computer-readable code including program code for: a TxPort-unencapsulated network and an encapsulated-DA in association with a unencapsulated-DA and an associated encapsulation identifier; and retrieving, the TxPort-unencapsulated network or an encapsulated-DA based on a single lookup of the unencapsulated-DA and the associated encapsulation identifier.

In an optional embodiment, the computer-readable storage medium of further includes program code for: storing a TxPort-encapsulated network in association with a unencapsulated-DA and an associated encapsulation identifier; and retrieving the TxPort-encapsulated network based on a single lookup of the unencapsulated-DA and the associated encapsulation identifier.

In an optional embodiment, the computer-readable storage medium further includes program code for: storing an RxPort-unencapsulated network in association with an unencapsulated source address and the associated encapsulation identifier.

According to the teachings of the present embodiment there is provided a method of communications at an encapsulating bridge including the steps of: receiving a packet having an unencapsulated source address and an associated encapsulation identifier; and learning, based on the unencapsulated source address and the associated encapsulation identifier, an encapsulated source address for the packet.

In an optional embodiment, the learning further includes: learning, based on the unencapsulated source address and the associated encapsulation identifier, an RxPort-encapsulated network of the packet; and learning, based on the encapsulated source address, the RxPort-encapsulated network of the packet.

In an optional embodiment, the learning is done at least in part using an FDB (forwarding/filtering database). In an optional embodiment, the packet is received from an encapsulated network port by a B-Comp (B-component) and the encapsulating bridge is on an encapsulated network.

In an optional embodiment, the encapsulating bridge is a BEB (backbone edge bridge); the associated encapsulation identifier is an I-SID (backbone service instance identifier); the encapsulated source address is a B-SA (backbone source address); the RxPort-encapsulated network is an RxPort-PNP (provider network port [PNP] side receive port); the encapsulated network port is a provider network port PNP; the encapsulated network is a PBBN (provider backbone bridged network); the unencapsulated source address is a C-SA (customer source address); and the RxPort-unencapsulated network is an RxPort-CNP (customer network port [CNP] side receive port); and encapsulation is MAC-in-MAC encapsulation.

According to the teachings of the present embodiment there is provided a system for communications including: a processing system on an encapsulating bridge, the processing system containing one or more processing modules and configured to: receive a packet having a unencapsulated source address and an associated encapsulation identifier; and learn, based on the unencapsulated source address and the associated encapsulation identifier, an encapsulated source address for the packet.

In an optional embodiment, the system includes a FDB (forwarding/filtering database) processing module and wherein the learning is done at least in part using the FDB.

In an optional embodiment, the processing system is further configured to: learn, based on the unencapsulated source address and the associated encapsulation identifier, an RxPort-encapsulated network of the packet; and learn, based on the encapsulated source address, the RxPort-encapsulated network of the packet.

In an optional embodiment, the packet is received from an encapsulated network port by a B-Comp and the encapsulating bridge is on an encapsulated network.

According to the teachings of the present embodiment there is provided a computer-readable storage medium having embedded thereon computer-readable code for communications, the computer-readable code including program code for: determining, based on an unencapsulated source address and an associated encapsulation identifier of a packet, an encapsulated source address for the packet.

In an optional embodiment, the program code is further configured to: determine, based on the unencapsulated source address and the associated encapsulation identifier, an RxPort-encapsulated network of the packet; and determine, based on the encapsulated source address, the RxPort-encapsulated network of the packet.

According to the teachings of the present embodiment there is provided a computer-readable storage medium having embedded thereon computer-readable code for database storage and retrieval, the computer-readable code including program code for: storing an encapsulated source address in association with a unencapsulated source address and an associated encapsulation identifier; and retrieving the encapsulated source address based on a single lookup of the unencapsulated source address and the associated encapsulation identifier.

In an optional embodiment, the computer-readable storage medium further includes program code for: storing an RxPort-encapsulated network in association with an unencapsulated source address and an associated encapsulation identifier of a packet; and retrieving the RxPort-encapsulated network based on a single lookup of the unencapsulated source address and the associated encapsulation identifier.

BRIEF DESCRIPTION OF FIGURES

The embodiment is herein described, by way of example only, with reference to the accompanying drawings, wherein:

FIG. 1C, a table detailing steps of conventional I-Comp and B-Comp processing.

FIG. 2B, a table detailing processing steps for the second embodiment.

FIG. 3B, a table detailing processing steps for the third embodiment.

FIG. 4A, a flowchart of a first embodiment for reducing lookups.

FIG. 4B, a table detailing processing steps for the first embodiment.

ABBREVIATIONS AND DEFINITIONS

Figure 1A:
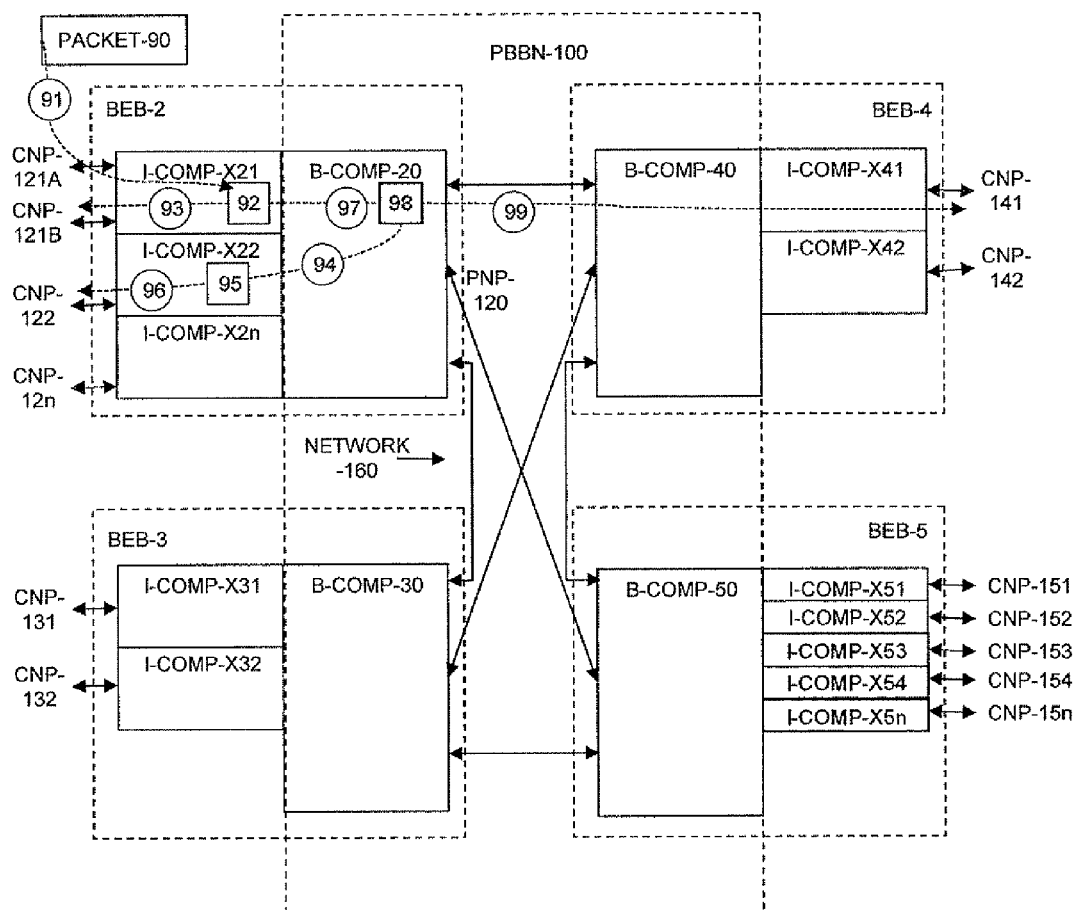
FIG. 1A, a diagram of communications using an exemplary provider backbone bridge network.

For convenience of reference, this section contains a list of abbreviations, acronyms, and short definitions used in this document. This section should not be considered limiting. Fuller descriptions can be found below, and in the applicable Standards, such as IEEE Std 802.1Q-2011 sections 3 and 4.

B—In combination, refers to the Backbone.

B-Comp, B-Component—responsible for mapping the I-SIDs to the appropriate B-VLANs.

B-DA—Backbone Destination (MAC) address (generally, encapsulated destination address).

B-SA—Backbone Source (MAC) address (generally, encapsulated source address).

B-TAG—Backbone VLAN tag.

B-VID—Backbone VLAN Identifier. 12-bit field ($2^{12}$~4000 possible B-VIDs). Generally an encapsulated virtual network identifier.

B-VLAN—Backbone Virtual LAN.

BEB—Backbone edge bridge (generally, an encapsulating bridge, switch, or router).

C—In combination, refers to the Customer.

C-DA—Customer Destination (MAC) address (generally, an unencapsulated destination address (DA)).

C-SA—Customer Source (MAC) address (generally, an unencapsulated source address).

C-TAG—Customer VLAN tag.

C-VID—Customer VLAN Identifier. Assigned to an Ethernet frame by a customer independent of S-VID.

CNP—Customer Network Port (generally, an unencapsulated network port).

Customer—A network that gets services from a provider network.

DA—Destination (MAC) Address.

DEI—Drop Eligible Indicator.

FDB—forwarding/filtering database.

I—In combination, refers to the Service Instance.

I-Comp, I-Component—responsible for (1) mapping customer Ethernet traffic to the appropriate I-SID, (2) mapping customer Ethernet traffic with the I-SID to either back to the customer or to a provider MAC Address, and (3) mapping provider Ethernet traffic to customer ports. The mapping can be per port, per port+S-VLAN, or per port+S-VLAN+C-VLAN. The B-Component is then responsible for mapping the I-SIDs to the appropriate B-VLANs. Each I-Comp is assigned a unique B-DA.

I-Comp-X—used in this document to indicate the I-component indicator (indicator of which I-comp is being used), or that any one of a number of I-Comps can be used.

I-Comp-Xn—where "n" is an integer number. Used in this document to indicate a specific I-Comp, generally used in examples for clarification, and not limiting the implementation of the embodiment.

I-SID—Backbone Service Instance Identifier. 24-bit field ($2^{24}$~16M possible I-SIDs).

I-TAG—Backbone Service Instance tag. In PBB frame format, contains also the I-SID, DA, and SA.

LAN—Local Area Network.

MAC—Media Access Control. In the seven-layer OSI model of computer networking, the MAC data communication protocol is a sublayer of the data link layer, which itself is layer 2. The MAC sublayer provides addressing and channel access control mechanisms that enable several terminals, or network nodes, to communicate within a multiple access network that incorporates a shared medium, e.g. Ethernet. The hardware that implements the MAC is generally referred to as a medium access controller.

MAC-in-MAC see "PBB".

PBB—Provider Backbone Bridge. A Backbone Core Bridge or a Backbone Edge Bridge. Also known as MAC-in-MAC. Frame switching may be based on a 12-bit B-VID, and customer identification is based on a 24-bit I-SID. A set of architecture and protocols for routing over a provider's network allowing interconnection of multiple Provider Bridge Networks without losing each customer's individually defined VLANs.

PBBN—Provider Backbone Bridged Network. A network using Backbone Edge Bridges and Backbone Core Bridges to interconnect Provider Bridged Networks and other networks. A connectionless network based on Ethernet but with additions to improve scalability and separation of customer and backbone traffic. Generally, an encapsulated network.

PCP—Priority Code Point.

PNP—Provider Network Port (generally, an encapsulated network port).

Provider—A network that provides services to a customer network.

RxPort-CNP—customer network port [CNP] side receive port (generally an RxPort-unencapsulated network).

RxPort-PNP—provider network port [PNP] side receive port (generally, RxPort-encapsulated network).

S-TAG—Service VLAN tag. A VLAN tag with a Tag Protocol Identification value allocated for "802.1Q Service Tag EtherType."

S-VID—Service VLAN Identifier. Assigned to an Ethernet frame by a service provider independent of C-VID, conveyed in an S-TAG. 12-bit field ($2^{12}$~4000 possible S-VIDs). Generally, a virtual network identifier.

S-VLAN—Service VLAN, identified by an S-VID.

SA—Source (MAC) Address.

SAP—Service Access Point—The point at which a service is offered.

Service instance—A service instance is a set of Service Access Points (SAPs) such that a Data.Request primitive presented to one SAP can result in a Data.Indication primitive occurring at one or more of the other SAPs in that set. In the context of operators and customers, a particular customer is given access to all of the SAPs of such a set by the operator. In customer bridges, the service instance is identified by a C-VID, and in Provider Bridges by an S-VID.

VLAN—Virtual LAN.

WAN—Wide Area Network.

DETAILED DESCRIPTION

The principles and operation of the system and method according to a present embodiment may be better understood with reference to the drawings and the accompanying description. A present invention is a method for improving performance of encapsulated packets, such as MAC-in-MAC, communications on IEEE 802.1 style networks. The system facilitates providing increased communications, including faster transmission rates, decreased latency of processing (by reducing lookups), and increased transmission bandwidth (saving transmission bandwidth by reducing lookups).

A method of communications at an encapsulating bridge includes receiving a packet having an unencapsulated-DA (destination address) and an associated unencapsulated virtual network identifier. The received port identifier and the unencapsulated virtual network identifier are used to determine the encapsulation identifier. The unencapsulated-DA and the associated encapsulation identifier are used to determine a TxPort-unencapsulated network (unencapsulated network side transmit port) or an encapsulated-DA for the packet. Implementations of the current invention can be used in general for encapsulated packet communications. For clarity in this document, a specific case of MAC-in-MAC is used as a non-limiting example, but should not be considered limiting the scope of implementation of the current invention. Based on this description, one skilled in the art will be able to apply the teaching of this invention to other cases of encapsulated packets. The following is a partial list of general communications network elements, and the corresponding MAC-in-MAC communications elements used as non-limiting examples in the current description.

unencapsulated DA (destination address) is a C-DA;
encapsulating bridge is a BEB (backbone edge bridge);
unencapsulated virtual network identifier is an S-VID (service virtual local area network [VLAN] identifier);
associated encapsulation identifier is an I-SID (backbone service instance identifier);
TxPort-unencapsulated network is a TxPort-CNP (customer network port [CNP] side transmit port);
encapsulated-DA is a B-DA (backbone destination address);
TxPort-encapsulated network is a TxPort-PNP (provider network port [PNP] side transmit port);
unencapsulated network port is a CNP (customer network port);
encapsulated network is a PBBN (provider backbone bridged network);
encapsulated virtual network identifier is a B-VID (backbone VLAN identifier);
unencapsulated source address is a C-SA (customer source address); and
RxPort-unencapsulated network is an RxPort-CNP (customer network port [CNP] side receive port).
encapsulated source address is a B-SA (backbone source address);
RxPort-encapsulated network is an RxPort-PNP (provider network port [PNP] side receive port);
encapsulated network port is a provider network port PNP; and
RxPort-unencapsulated network is an RxPort-CNP (customer network port [CNP] side receive port).

For clarity in this document, an embodiment is described using a unicast packet. Similarly, for clarity, the exemplary descriptions use I-SID/S-VID "1:1" mode. Similarly, for clarity the S-VID is assumed to not be removed from the packets traversing the PBBN. Based on this description, one skilled in the art will be able to implement other embodiments of the current invention for multicast packets, for I-SID/S-VID "1:N" mode, and removal of the S-VID from the packet, as appropriate for a specific application.

Provider Backbone Bridges (PBBs) also known as "MAC-in-MAC" is a set of architecture and protocols for routing over a provider's network allowing interconnection of multiple Provider Bridge Networks without losing each customer's individually defined VLANs.

Note also that while the below description focuses on a path from customer ports, embodiments of the current invention can also be used from provider ports.

Figure 1B:
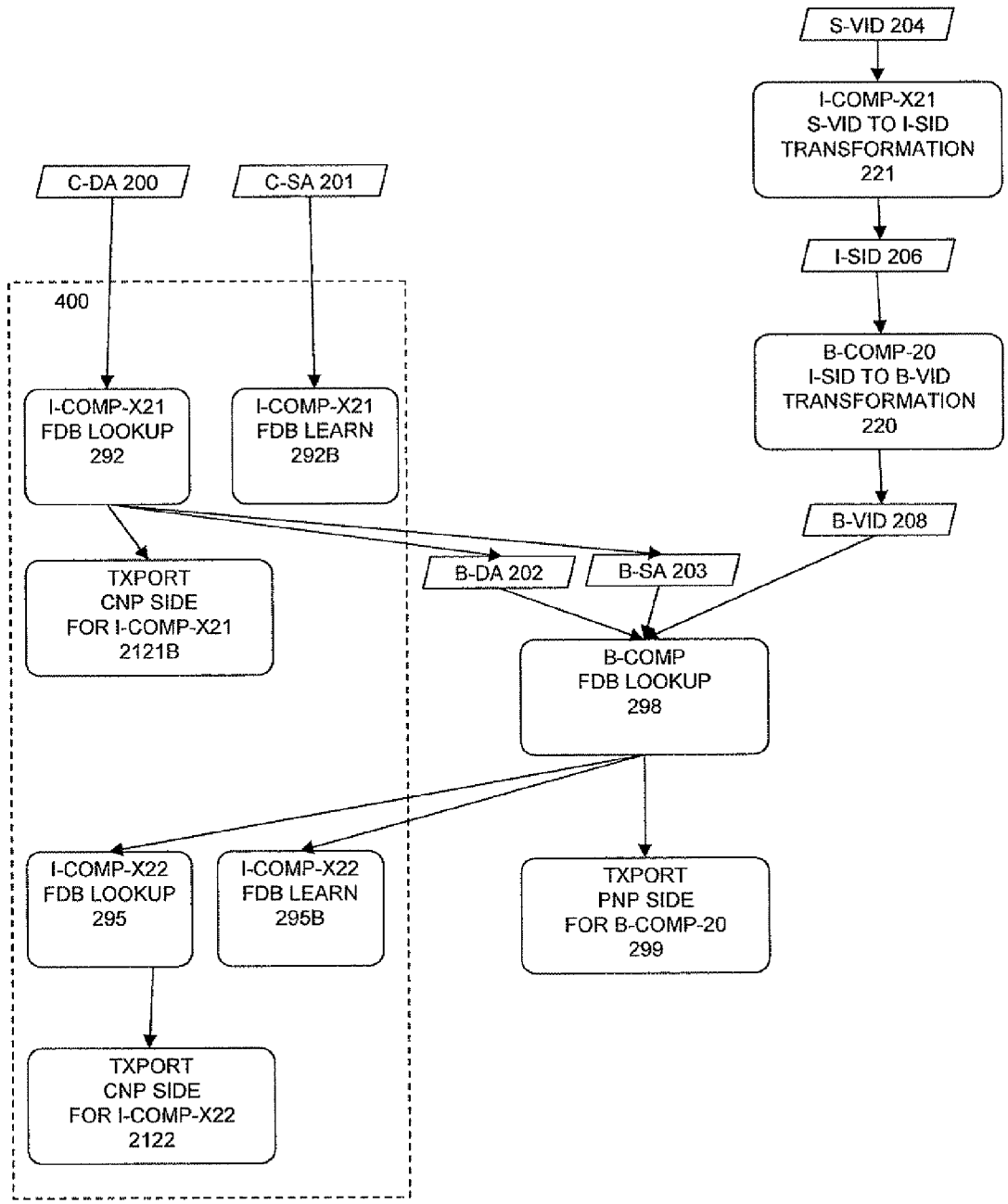
FIG. 1B, a flowchart of conventional I-Comp and B-Comp processing.

General Implementation—FIGS. 1A, 1B, 1C

Referring to FIG. 1A, a diagram of communications using an exemplary provider backbone bridge network (PBBN-100), is provided for reference. Example PBBN-100 includes four BEBs (backbone edge bridges, BEB-2, BEB-3, BEB-4, and BEB-5). Each BEB may have many I-Components. Each BEB is shown with a number of exemplary I-Comps (I-Components), generally labeled as I-Comp-X, or I-Comp-Xnn, where <nn> is a reference number referring to a specific I-Comp. BEB-2 includes exemplary I-Comps I-COMP-X21, I-COMP-X22, and I-COMP-X2n. It will be obvious to one skilled in the art that in this case, I-COMP-X2n refers to BEB-2 possibly having multiple additional I-Comps, in addition to the two exemplary I-Comps shown. BEB-3 includes I-COMP-X31, and I-COMP-X32. BEB-4 includes I-COMP-X41, and I-COMP-X42. BEB-5 includes I-COMP-X51, I-COMP-X52, I-COMP-X53, I-COMP-X54, and I-COMP-X5n. Similar to I-COMP-X2n, the notation I-COMP-X5n refers to BEB-5 having additional I-Comps, in addition to the four exemplary I-Comps shown.

Each BEB has a B-Comp (B-Component) associated with the I-Comps of that BEB. BEB-2 has B-COMP-20 operationally connected to I-COMP-X21, I-COMP-X22, and I-COMP-X2n. BEB-3 includes B-COMP-30, BEB-4 includes B-COMP-40, and BEB-5 includes B-COMP-50.

Each I-Comp can have one or more Customer Network Ports (CNPs) connected. Exemplary I-COMP-X21 has two CNPs: CNP-121A and CNP-121B. I-COMP-X22 is shown with CNP-122, and I-COMP-X2n is shown with CNP-12n, indicating that each I-Comp may be connected to more than one (additional) customer network. Similarly, I-COMP-X31 is shown with CNP-131, I-COMP-X32 is shown with CNP-132, I-COMP-X41 is shown with CNP-141, I-COMP-X42 is shown with CNP-142, I-COMP-X51 is shown with CNP-151, I-COMP-X52 is shown with CNP-152, I-COMP-X53 is shown with CNP-153, I-COMP-X54 is shown with CNP-154, and I-COMP-X5n is shown with CNP-15n. Similar to the above-described notation, I-COMP-X5n is an example indication that any of the BEBs may have additional I-Comps, and CNP-15n is an exemplary indication that each I-Comp may be connected to multiple customer networks.

PBBN-100 uses exemplary mesh NETWORK-160 to connect the BEBs. Each connection of a BEB to the NETWORK-160 is identified by a Provider Network Port (PNP). One PNP is shown in the current figure, PNP-120 connected to BEB-2 (B-COMP-20). Note that in the case where a network connection is not available directly between two B-Comps (for example, from B-COMP-20 to B-COMP-30), B-Comps can route between other B-Comps (for example from B-COMP-20 through B-COMP-40 to B-COMP-30. In other words, routing to B-Comps can be other than direct. Network connections and variations will be known to one skilled in the art.

The destination for a packet can be outside the network that is the source of the packet. Typically, packet sources are referred to by the source address (SA) of the packet, and the destination of the packet referred to by the destination address (DA) of the packet. More specifically, customer packets can be referred to by the C-SA (Customer Source MAC address) having a C-DA (Customer Destination MAC address). For example, PACKET-90 with a C-SA on the network associated with CNP-121A may have a C-DA on the network associated with CNP-121B, CNP-122, or CNP-141. Note, it will be obvious to one skilled in the art that for clarity, references to CNPs can also refer to the network associated with that CNP. PACKET-90 is transmitted via first communications path 91 from CNP-121A to I-COMP-X21 for processing, shown as I-COMP-X21 processing element 92. For clarity in this description, "I-COMP-X21 processing element 92" is generally referred to in this description as "processing 92". Similarly, "I-COMP-X22 processing element 95" is generally referred to in this description as "processing 95", and "B-COMP-20 processing element 98" is generally referred to in this description as "processing 98". It will be obvious to one skilled in the art that "processing" occurs on hardware such as a "processor", firmware, and/or dedicated hardware, and will not be confused by the use of the label "processing <nn>" for clarity. One skilled in the art will realize that processing (including I-COMP-X21 processing 92, I-COMP-X22 processing 95, and B-COMP-20 processing 98) includes transformations, FDB (forwarding/filtering database) lookups, mappings, and learning (such as database learning).

In general, a packet arriving to an I-Comp (for example from CNP-121A to I-COMP-X21) can be transmitted internally (to a CNP on that I-Comp, for example, via third communications path 93 to CNP-121B), or externally (to B-COMP-20 via seventh communications path 97). Packets arriving from an I-Comp to a B-Comp can be transmitted internally (to an another I-Comp, whether on the BEB associated with the I-Comp, for example, via fourth communications path 94 to, I-COMP-X22 on BEB-2 [and then via sixth communications path 96 to CNP-122], or externally to another BEB, for example via ninth communications path 99 to BEB-4 to B-COMP-40 and then to I-COMP-41 [and onward to CNP-141]). Similarly, packets arriving from another BEB to a B-Comp (for example, from B-COMP-50 to B-COMP-20) can be transmitted internally (to an I-Comp on that B-Comp, for example to I-COMP-X22) or externally (for example, to B-COMP-40). From CNP side the I-Comp requires a lookup (at processing 92) to know if the packet is destined back to the CNP's at the I-Comp side, or if the packet is destined to the B-Comp. The B-Comp requires a lookup (at processing 98) to know if the packet is destined to a CNP local in the BEB or if the packet is destined to a PNP port to transmit the packet to a further B-Comp. From PNP side, the B-Comp requires a lookup (at processing 98) to know if the packet is destined to a CNP local in the BEB or if the packet is destined to a PNP port to transmit the packet to a further B-Comp. The I-Comp requires a lookup (at processing 92) to know the CNP port to transmit the packet.

As will be obvious to one skilled in the art, path 99 includes processing at B-COMP-40 and I-COMP-X41 (similar to processing 98 and 92, respectively). This path 99 processing is not shown in the diagram for simplicity.

In general, as will be known to one skilled in the art, every time a packet is received by an I-Comp and a B-Comp, learning is done by the Component (I-Comp or B-Comp) to learn where the packet came from (from which port the packet arrived), so that when subsequent packets are received by the Component (received from any direction, customer-side ports or provider-side ports) the Component knows to which port the received packet should be transmitted. For example, when PACKET-90 arrives at I-COMP-X21 via path 91, I-COMP-X21 learns that the C-SA of PACKET-90 is on CNP-121A. I-COMP-X21 can now check the C-DA of subsequent packets arriving from B-COMP-20 and know to which CNP to transmit this subsequent packet. When a packet arrives and the Component (both I-Comp and B-Comp) does not know (has not yet learned) to which port to transmit the packet, the packet is flooded to the appropriate network, in accordance with the specification as detailed in IEEE-802.1Q and IEEE-802.1ah. For example, when I-COMP-X21 receives PACKET-90 for the first time, and does not know to which port to send PACKET-90 (based on the C-DA of PACKET-90), I-COMP-X21 floods PACKET-90 to CNP-121B and to B-COMP-20. B-COMP-20 may flood the packet to B-COMP-30, B-COMP-40, and B-COMP-50. When the B-Comps, such as B-COMP-40 receives PACKET-90, B-COMP-40 learns to which port B-COMP-20 is connected, and I-COMP-X41 learns the B-SA of I-COMP-X21. When a subsequent packet is received from CNP-141 destined for CNP-121A, I-COMP-X41 knows to tell B-COMP-40 to send the packet to the B-DA assigned to I-COMP-X21. B-COMP-40 knows which port to use to reach I-COMP-X21. When the packet is received by B-COMP-20, B-COMP-20 knows to send the packet to I-COMP-X21. This last stage does not require learning, since a B-Comp is aware of the B-DA's of the I-Comps that are in the same BEB as the B-Comp).

Refer now to FIG. 1B, a flowchart of conventional I-Comp and B-Comp processing and FIG. 1C, a table detailing steps of conventional I-Comp and B-Comp processing. In FIG. 1C, the first column of the table is a reference number for the corresponding row of the table. The second column lists which block of FIG. 1B corresponds to the processing of that row. The third column lists which Component of FIG. 1A is doing the processing of that row. As described above, for, I-COMP-X21 this is processing 92, for I-COMP-X22 this is processing 95, and for B-COMP-20 this is processing 98. The fourth column lists the general type of processing, for example, "lookup" or "learn". The fifth column lists the specific function being performed, and the sixth column lists additional notes.

Line 301 is a placeholder indicating that a packet is received by an I-Comp from a CNP, the packet having C-DA 200, C-SA 201, and S-VID 204. For example, I-COMP-X21 receiving PACKET-90 from CNP-121A via path 91 and processing 92.

On line 302, in block 221, I-COMP-X21 performs a lookup using I-COMP-X21 and S-VID 204 to produce a corresponding I-SID 206, also referred to as S-VID to I-SID transformation. Processing on I-COMP-X21, such as lookups and learning are shown as processing 92. Functionally, the notation of this processing is "S-VID->I-SID". As noted above in the discussion of use of terminology, in this ease "I-COMP-X21" refers to the I-Comp on which the processing is occurring. The I-Comp implicitly knows where PACKET-90 is being processed (on that I-Comp). As will be obvious to one skilled in the art, depending on the implementation, an indication may be needed of which I-Comp is associated with a packet.

On line 303, in block 220, B-COMP-20 performs a lookup using the I-SID 206 to produce a corresponding B-VID 208. Functionally: I-SID->B-VID.

On line 304, in block 292, I-COMP-X21 performs an FDB lookup using C-DA 200 to produce either TxPort-CNP-I-Comp-X21 2121B or: B-DA 202, depending on whether the C-DA is on I-COMP-X21 or not, respectively. An I-Comp is assigned a B-SA, in the current example I-COMP-X21 is assigned B-SA 203. In this example, B-SA 203 is I-COMP-X21. Functionally: C-DA->TxPort-CNP-I-Comp-X21, or B-DA.

On line 305, in block 298, if the processing of line 304 produced B-DA 202, then (PACKET-90 is transmitted via path 97 to B-COMP-20) B-COMP-20 performs an FDB lookup using B-DA 202 and B-VID 208 to produce either I-COMP-X2 (such as I-COMP-X22 in the current example, or I-COMP-X2n) or TxPort-PNP 299, depending on whether the B-DA is associated with B-COMP-20 (on BEB-2) or not, respectively. Processing on B-COMP-20, such as lookups and learning are shown as processing 98. Functionally: B-DA, B-VID->I-Comp-X22, TxPort-PNP. Note the notation used on the current line—I-COMP-X2 (not -X21, -X22, -X2n, etc.). This notation is used to refer to any of the I-Comps on BEB-2. In other words, to indicate that the lookup produces -X21, -X22, -X2n, etc.

If the processing of line 305 produced I-COMP-X22, then (PACKET-90 is transmitted via path 94 to I-COMP-X22, processing 95) on line 306, in block 295 I-COMP-X22 performs an FDB lookup using C-DA 200 to produce TxPort-CNP-I-Comp-X22 2122. In this example, B-DA 202 is I-COMP-X22. Functionally: C-DA->TxPort-CNP-I-Comp-X22.

PACKET-90 is then transmitted via path 96 to CNP-122. Processing on I-COMP-X22, such as lookups and learning are shown as processing 95.

On line 307, in block 292B, I-COMP-X21 performs FDB learning using C-SA 201 to learn RxPort-CNP-I-Comp-X21. Functionally: C-SA->RxPort-CNP-I-Comp-X21.

On line 308, if the processing of line 305 produced I-COMP-X22, then in block 295B, I-COMP-X22 performs FDB learning using B-SA 203 and C-SA 201 to learn B-SA-I-Comp-X22. Functionally: C-SA->B-SA-I-Comp-X22.

Lines 309-315 include the processing steps when a packet is received from the PNP. Based on the above description of the transmission direction (from a CNP), given the below description and corresponding portion of the current table, one skilled in the art will be able to implement processing for the receive direction (from a PNP). Hence, the receive direction is described in relatively less detail than the above steps for receiving a packet from the CNP. The functional notation used in this document follows the functional notation described above.

Line 309 is a placeholder indicating that a packet is received from a PNP, such as PNP-120, the packet having a B-DA, B-SA, B-VID, I-SID, and encapsulated C-DA, C-SA or S-VID.

On line 310, B-COMP-20 performs a lookup using B-DA and B-VID to produce I-Comp-X2 or TxPort-PNP.

If B-DA is I-Comp-X21, then on line 311, I-COMP-X21 performs an FDB lookup using C-DA to produce TxPort-CNP-I-Comp-X21.

If B-DA is I-Comp-X22, then on line 312, I-COMP-X22 performs an FDB lookup using C-DA to produce TxPort-CNP-I-Comp-X22.

If B-DA is I-Comp-X21, then on line 313, I-COMP-X21 performs FDB learning using C-SA to learn B-SA from the received packet.

If B-DA is I-Comp-X22, then on line 314, I-COMP-X22 performs learning using C-SA to learn B-SA from the received packet.

On line 315, B-COMP-20 performs learning using B-SA to learn RxPort-PNP.

When doing encapsulation to MAC-in-MAC there is a need for two FDB (forwarding/filtering database) lookups:

1. In the I-Component, from C-DA (customer destination address) to B-DA (backbone destination address). Formally: C-DA->B-DA. This encapsulation can be seen in the references to line 304, above.

2. In B-Component, from B-DA (backbone destination address) to PNP TQ (backbone port). Formally: {B-DA, B-VID}->PNP TQ. This encapsulation can be seen in the references to line 305, above.

When doing de-capsulation from MAC-in-MAC there is a need for two FDB (forwarding/filtering database) lookups:

1. In B-Component, from B-DA (backbone destination address) to PNP TQ (backbone port). Formally: {B-DA, B-VID}->PNP TQ. This de-capsulation can be seen in the references to line 310, above.

2. In the I-Component, from C-DA (customer destination address) to B-DA (backbone destination address). Formally: C-DA->B-DA. This encapsulation can be seen in the references to lines 311 and 312, above.

For completeness, note there is another lookup from S-VID->I-SID, that is not relevant to understanding the current invention.

In embodiments of the current invention (specifically the first, second, and third embodiments described below), innovative combinations of conventional functionality improve performance of MAC-in-MAC communications by reducing latency of processing by reducing lookups, thereby increasing transmission bandwidth of the communications network. The invention also facilitates embodiments with reduced memory and processing requirements, as compared to conventional implementations.

This combination of lookups saves at least one lookup. Each FDB lookup consumes, for example, 1 clock cycle, so reducing lookups allows more bandwidth on the same FDB. In other words, instead of two lookups for MAC-in-MAC encapsulation, only one lookup is needed, thus reducing by 50% the bandwidth needed for this processing. In the case where a packet is being communicated from one CNP to another CNP on the same I-Camp (for example, from CNP-121 to CNP-122), conventional techniques require three lookups, compared to the current embodiment that can be implemented using only 1 lookup. Hence, in this case reducing by 67% communications latency and bandwidth requirements. This combination can be implemented with no increase in the number of database entries, thus no additional memory is needed for implementation.

First Embodiment—FIGS. 4A, 4B

In general, a first embodiment combines FDB lookups (generally simply referred to as lookups) of the I-Components and B-Components. This combination uses the S-VID to provide both an I-SID and B-VID. Functionally: {I-Comp-X21, S-VID}->I-SID, B-VID.

This combination of lookups is achievable in part because of the recognition that while the number of I-SIDs is large compared to the number of S-VIDs and B-VIDs, combined with the fact that B-VID is a function of I-SID, and I-SID is a function of S-VID.

Specifically, S-VIDs are represented as a 12-bit field. Thus, there are $2^{12}$, or approximately 4000 (4K) possible S-VIDs. I-SIDs are represented as a 24-bit field. Thus, there are $2^{24}$, or approximately 16 million (16M) possible I-SIDs. B-VID are represented as a 12-bit field. Thus, there are $2^{12}$, or approximately 4000 (4K) possible B-VIDs. Typically, lookup functions (and specifically FDB lookups) for S-VID, I-SID, and B-VID are implemented using tables. One skilled in the field will realize the desirability of using only 4K lookups tables, without the need for a 16M lookup table.

Recognizing that B-VID is a function of I-SID, formally B-VID=f(I-SID), and that for a specific I-Comp-X the I-SID is a function of S-VID, formally I-SID=f(S-VID, I-Comp-X), an innovative function can be derived for B-VID based on S-VID, formally B-VID=f(S-VID, I-Comp-X). Using this innovative function, both I-SID and B-VID can be provided (generated, lookup) from S-VID: f(S-VID, I-Comp-X)->{I-SID, B-VID}. As B-VID is generated as a function of S-VID, at least the latency of one lookup is avoided (using I-SID to generate B-VID), along with the associated memory requirements (relatively large 16M I-SID table, as compared to the relatively smaller 4K S-VID table.

Typically, I-SID lookup (S-VID->I-SID) is implemented separately in each I-Component (for the CNPs associated with that I-Comp) and B-VID lookup (I-SID->B-VID) is implemented in an associated B-Component for the BEB to which the I-Comps belong. This first embodiment of the innovative function f(S-VID)->{I-SID, B-VID} can be implemented as a single lookup in the BEB, preferably in one of the I-Comps. One skilled in the art will understand from the above description that this first embodiment is not simply a combination of existing functions, but a hybrid technique providing improved functionality over existing techniques.

Refer now to FIG. 4A, a flowchart of a first embodiment for reducing lookups and FIG. 4B, a table detailing processing steps for the first embodiment. The structure of the current table is similar to the structure described below in reference to the table of FIG. 1C. The conventional processing blocks in FIG. 1B (221 and 220) are replaced with the innovative first embodiment processing block in FIG. 4A block 821. As described above, while the processing of block 821 can be implemented generally in the BEB (in this case BEB-2 for I-COMP-X2 and B-COMP-20), for simplicity in the current description block 821 is shown as being implemented in I-COMP-X21.

Line 801 is a placeholder indicating that a packet is received by an I-Comp from a CNP, the packet having C-DA 200, C-SA 201, and S-VID 204. In the current exemplary implementation, FDB lookup processing for BEB-2 is implemented on I-COMP-X21 in processing 92. In this case, I-COMP-X21 receives PACKET-90 from CNP-121A via path 91 and processing 92

On line 802, in block 821, I-COMP-X21 performs a lookup using I-COMP-X21 and S-VM 204 to produce a corresponding I-SID 206 and B-VM 208, also referred to as S-VID to I-SID and B-VID transformation. This processing is similar to the processing of FIG. 1C lines 302 and 303. Functionally, the notation of this processing is: "{I-Comp-X21, S-VID}->I-SID, B-VID".

Figure 2A:
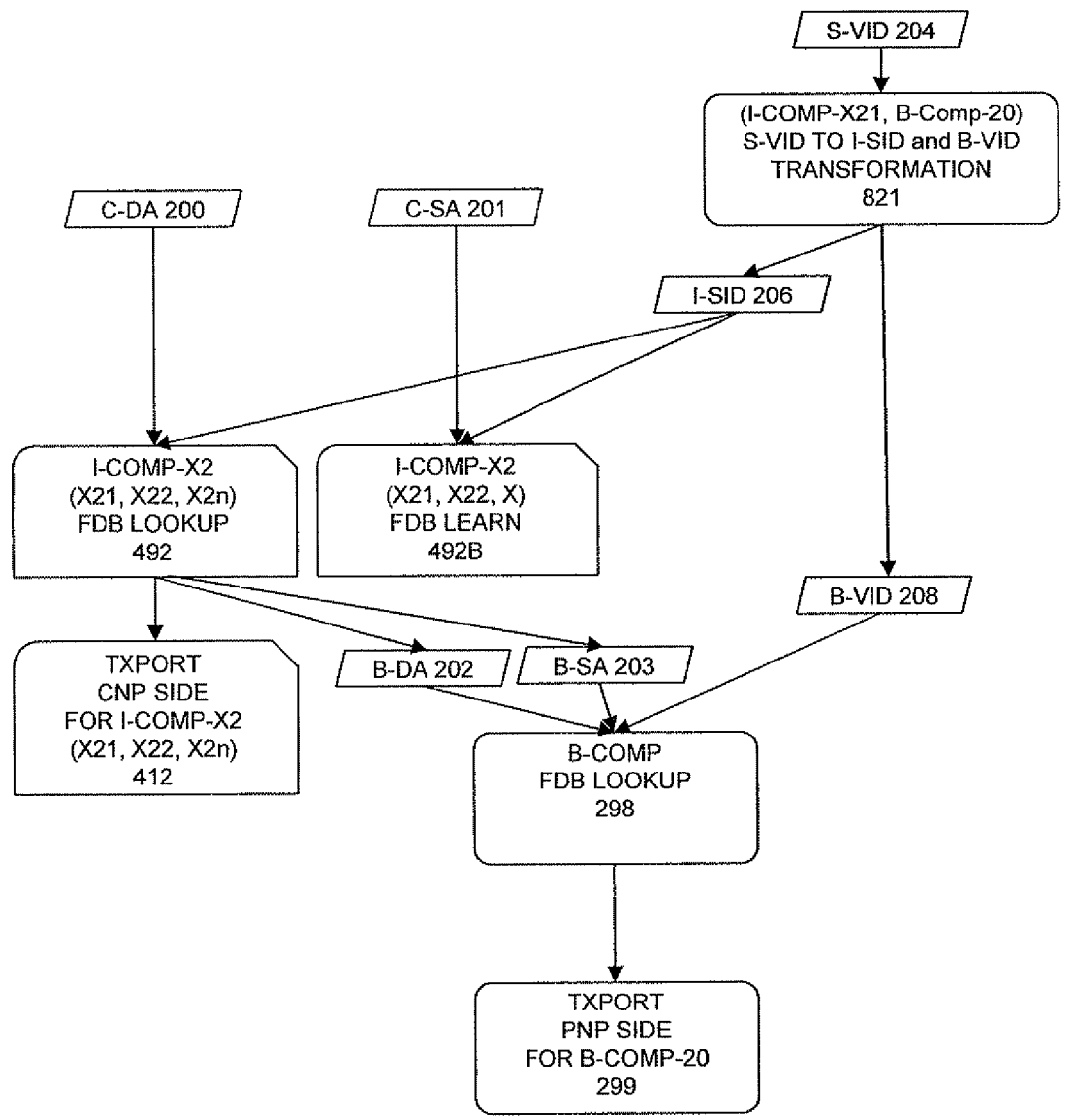
FIG. 2A, a flowchart of a second embodiment for reducing lookups.

Second Embodiment—FIGS. 2A, 2B

In general, a second embodiment combines FDB lookups (generally simply referred to as lookups) of the I-Components. This combination uses the C-DA and I-SID to provide either a CNP side transmit port (TxPort-CNP) or a B-DA. Formally: {C-DA, I-SID}->TxPort-CNP or B-DA.

This combination of lookups is achievable in part because of the recognition that the I-SID encapsulates information about the I-Comp-X. Conventional implementations can be thought of as having a separate database for each of the I-Comps, and each I-Comp access a database on that I-Comp to determine a destination for a packet being processed. For example, I-COMP-X21 includes processing 92, which can be considered to have processing (lookups and learning) and a database for I-COMP-X21. Similarly, I-COMP-X22 includes processing 95 for lookups and learning with a database on I-COMP-X22. In contrast, in this second embodiment, a common database for all of the I-Comps on BEB-2 is implemented on BEB-2, for example preferably on I-COMP-X21. In the context of this document, this common database functionality is referred to as being implemented on I-COMP-X2, for example, in FIG. 2B lines 503 and 507. This common database can be considered a functional module of the BEB. Based on this description, one skilled in the art will be able to implement the database module in a location appropriate for a specific application.

In conventional implementations, one lookup is performed per I-Comp, using only the C-DA For example, see FIG. 1C line 306. An example of a conventional communications path is: CNP-121A to I-COMP-X21 to B-COMP-20 to I-COMP-X22 to CNP-122. In contrast, an example of a communications path using the second embodiment is: CNP-121A to I-COMP-X2 to CNP-122. Note the notation used in the example communications path of the second embodiment—processing is done on I-COMP-X2 (not -X21, -X22, -X2n, etc.). This notation is used similar to the above-description of this notation, that is, that -X2 refers to any or in this case all of the I-Comps on BEB-2. In this case, to indicated that a new functional module (-X2, obviously with associated processing, not shown in the figures), replaces the conventional multiple processing [of -X21 (with processing 92), -X22 (with processing 95), etc.). I-COMP-X2 now has to "know" from which I-Comp the lookup has been done, so I-COMP-X2 uses information of the I-SID that encapsulates the information about the I-Comp. This innovative scheme requires a lookup using {C-DA, I-SID} (see below line 503 and elsewhere) which provides needed information to perform the lookup.

Refer now to FIG. 2A, a flowchart of a second embodiment for reducing lookups and FIG. 2B, a table detailing processing steps for the second embodiment. The structure of the current table is similar to the structure described in reference to the table of FIG. 1C. The conventional processing blocks in FIG. 1B (292, 2121B, 295, 2122, 292B, 295B) shown in dashed rectangle 400 are replaced with the innovative second embodiment processing blocks in FIG. 2A (492, 412, and 492B, shown as snipped-corner boxes). The lookups of FIG. 1B blocks 292 and 295 (FIG. 1C lines 304 and 306) are combined into FIG. 2A block 492 (FIG. 2B line 503). Similarly, the learning of FIG. 1B blocks 292B and 295B (FIG. 1C lines 307 and 308) are combined into FIG. 2A block 492B (FIG. 2B line 507). Corresponding lookups and learning are implemented when a packet is received from the PNP.

As described above, processing is implemented on I-COMP-X2, which can include being implemented on I-COMP-X21 processing 92, I-COMP-X22 processing 95, or I-COMP-X.

A preferred implementation is to implement the second embodiment with the above-described first embodiment. In other words, implementing the first and second embodiments at the same time, in parallel. Implementation of both the first and second embodiments simultaneously can facilitate the above-described increased communications, including faster transmission rates, decreased latency of processing, and increased transmission bandwidth. Specifically, while the flowchart of FIG. 2A can be implemented with blocks 221 and 220 similar to FIG. 1B, the current FIG. 2A replaces blocks 221 and 220 with block 821. Note that in the below-described third embodiment, a similar preferred implementation includes the first embodiment.

Line 501, similar to FIG. 1C line 301, is a placeholder indicating that a packet is received by an I-Comp from a CNP, the packet having C-DA 200, C-SA 201, and S-VID 204. For example, I-COMP-X21 receiving PACKET-90 from CNP-121A via path 91 and processing 92.

On line 502, in block 821, I-COMP-X21 performs a lookup similar to line 802, using I-COMP-X21 and S-VID 204 to produce a corresponding I-SID 206 and B-VID 208, also referred to as S-VID to {I-SID, B-VID} transformation. Functionally, the notation of this processing is: "{I-Comp-X21, S-VID}->I-SID, B-VID".

On line 503, in block 492, I-COMP-X2 performs an FDB lookup using C-DA 200 and, I-SID 206 to produce either TxPort-CNP 412 or B-DA 202. Functionally: {C-DA, I-SID}->TxPort-CNP or B-DA. An I-Comp is assigned a B-SA, in the current example I-COMP-X21 is assigned B-SA 203. Note that while the FDB lookup function is united (combined for all I-Comps on a BEB), each I-Comp still has an associated B-SA (B-SA is non-united).

On line 505, in block 298, if the processing of line 503 produced B-DA 202, then (PACKET-90 is transmitted via path 97 to B-COMP-20), B-COMP-20 performs an FDB lookup using B-DA 202 and B-VID 208 to produce TxPort-PNP 299. Processing on B-COMP-20, such as lookups and learning are shown as processing 98. Functionally: {B-DA, B-VID}->TxPort-PNP.

On line 507, in block 492B, I-COMP-X2 performs FDB learning using C-SA 201 and I-SID 206 to learn RxPort-CNP. Functionally: {C-SA, I-SID}->RxPort-CNP.

Lines 509-515 include the processing steps when a packet is received from the PNP. Based on the above description of the transmission direction (from a CNP), given the below description and corresponding portion of the current table, one skilled in the art will be able to implement processing for the receive direction (from a PNP). Hence, the processing direction is described in relatively less detail than the above steps for receiving a packet from the CNP. The functional notation used in this document follows the functional notation described above.

Line 509 is a placeholder indicating that a packet is received from a PNP, such as PNP-120, the packet having a B-DA, B-SA, B-VID, and I-SID.

On line 510, B-COMP-20 performs a lookup using B-DA and B-VID to produce I-Comp-X2 or TxPort-PNP. Functionally: {B-DA, B-VID}->I-Comp-X2 or TxPort-PNP.

On line 511, if B-DA is I-Comp-X, then I-COMP-X2 performs an FDB lookup using C-DA and I-SID to produce TxPort-CNP. Functionally: {C-DA, I-SID}->TxPort-CNP.

On line 513, if B-DA is I-Comp-X, then I-COMP-X2 performs FDB learning using C-SA and I-SID to learn B-SA. Functionally: {C-SA, I-SID}->B-SA. Note, while line 313 has C-SA->B-SA, line 513 has {C-SA, I-SID}->B-SA. This is important for the lookup from the CNP side.

On line 515, B-COMP-20 performs learning using B-SA to learn RxPort-PNP. Functionally: B-SA->RxPort-PNP.

Figure 3A:
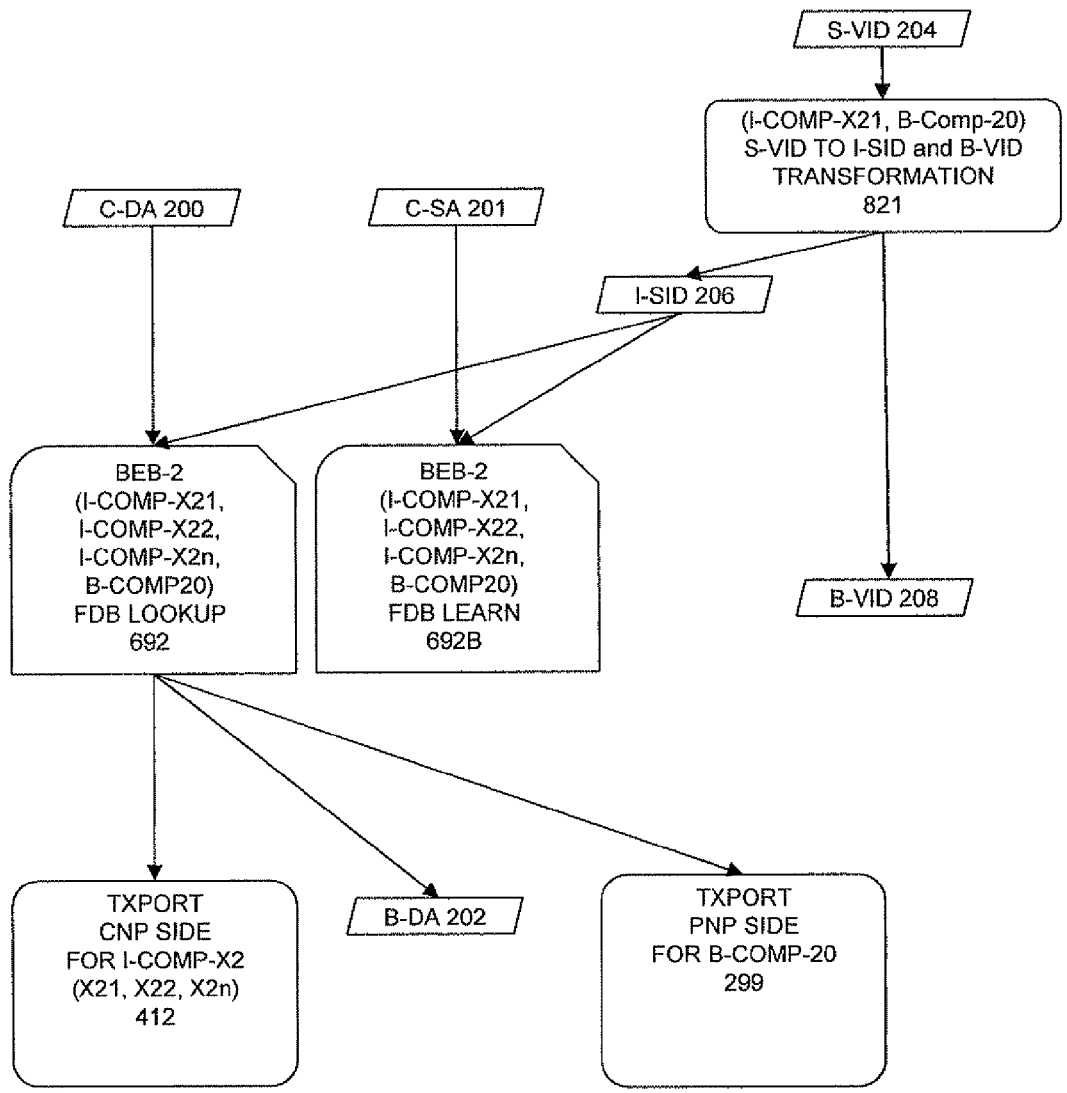
FIG. 3A, a flowchart of a third embodiment for reducing lookups.
Figure 5:
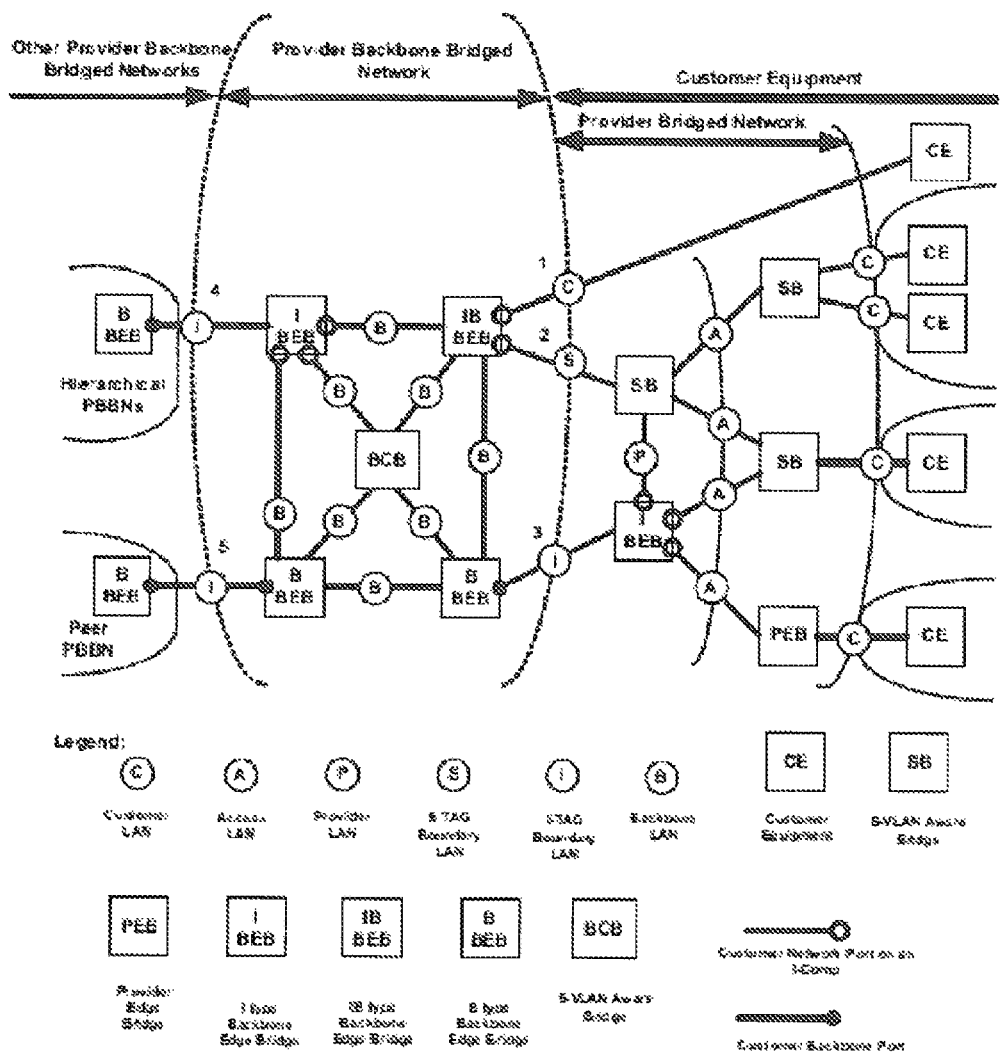
FIG. 5, an example of a PBBN.

Third Embodiment—FIGS. 3A, 3B

In first and second embodiments of the current invention, innovative combinations of conventional functionality improve performance of MAC-in-MAC communications by reducing latency of processing by reducing lookups, thereby increasing transmission bandwidth of the communications network.

In general, a third embodiment combines lookups of the I-Components and the B-Component (in a BEB). This combination is preferably implemented in one of the I-Components, where the C-DA and I-SID are used to provide a transmit port for the CNP (TxPort-CNP) or both B-DA and transmit port for the PNP (PNP TQ or notationally TxPort-PNP). Formally: "C-DA, I-SID->TxPort-CNP or TxPort-PNP, B-DA".

This combination of lookups is achievable in part because the I-SID encapsulates information about the I-Comp-X and the B-VID. Similar to the above description of the second embodiment, conventional implementations can be thought of as having a separate database for each of the I-Comps and B-Comp. Each I-Comp and B-Comp access a database on that Component to determine a destination for a packet being processed. For example, I-COMP-X21 includes processing 92, which can be considered to have processing (lookups and learning) and a database for I-COMP-X21. Similarly, I-COMP-X22 includes processing 95 for lookups and learning with a database on I-COMP-X22 and B-COMP-20 includes processing 98. In contrast, in this third embodiment, a common database for all of the I-Comps and B-Comp on BEB-2 is implemented on BEB-2.

In the above-described second embodiment, one (combined) lookup is performed for the I-Comps (I-COMP-X2 in block 492), and a second lookup is performed in the B-Comp (B-COMP-20, block 298). In this third embodiment, the B-Comp lookup is combined with the I-Comp lookup, providing an innovative hybrid functionality for the BEB.

Refer now to FIG. 3A, a flowchart of a third embodiment for reducing lookups and FIG. 3B, a table detailing processing steps for the third embodiment. The structure of the current table is similar to the structure described in reference to the table of FIG. 1C. The conventional processing blocks in FIG. 1B (292, 2121B, 295, 2122, 292B, 295B, 298) are replaced with the innovative third embodiment processing blocks in FIG. 3A (692, 692B, shown as snipped-corner boxes). The lookups of FIG. 2A blocks 492 and 298 (FIG. 2B line 503) are combined into FIG. 3A block 692 (FIG. 3B line 704). Similarly, the learning of FIG. 2A block 492B (FIG. 2B line 507) is now implemented in FIG. 3A block 692B (FIG. 3B line 707). Corresponding lookups and learning are implemented when a packet is received from the PNP.

While the processing of block 692 (and 692B) can be implemented generally in the BEB (in this case BEB-2 for I-COMP-X2 and B-COMP-20), for simplicity in the current description block 692 is shown as being implemented in I-COMP-X2. This common database can be considered a functional module of the BEB. Based on this description, one skilled in the art will be able to implement the database module in a location appropriate for a specific application. Similar to the above descriptions, for simplicity the flowchart does not include the processing blocks when a packet is received from the PNP. As also described above, while this third embodiment can be implemented with separate lookup blocks 221 and 220 similar to FIG. 1B, the current FIG. 3A used preferred implementation replacing blocks 221 and 220 with block 821.

Line 701, similar to FIG. 1C line 301, is a placeholder indicating that a packet is received by an I-Comp from a CNP, the packet having C-DA 200, C-SA 201, and S-VID 204. For example, I-COMP-X21 receiving PACKET-90 from CNP-121A via path 91 and processing 92.

On line 702, in block 821, I-COMP-X21 performs a lookup similar to line 802, using I-COMP-X21 and S-VID 204 to produce a corresponding I-SID 206 and B-VID 208, also referred to as S-VID to {I-SID, B-VID} transformation. Functionally, the notation of this processing is: "{I-Comp-X21, S-VID}->I-SID, B-VID".

On line 704, in block 692, I-COMP-X2 performs an FDB lookup using C-DA 200 and, I-SID 206 to produce either TxPort-CNP 412 or both B-DA 202 and TxPort-PNP 299. Functionally: C-DA, I-SID->TxPort-CNP or TxPort-PNP, B-DA. In other words, line 704 unites the lookups of lines 503 and 505. The assignment of a B-SA, in the current example I-COMP-X21 is assigned B-SA 203 is now internal to the processing of block 692. Note that while the FDB lookup function is united (combined for all I-Comps and B-Comp on a BEB), each I-Comp still has an associated B-SA (B-SA is non-united).

On line 707, in block 692B, I-COMP-X2 performs FDB learning using C-SA 201 and I-SID 206 to learn RxPort-CNP. Functionally: {C-SA, I-SID}->RxPort-CNP.

Lines 709-715 include the processing steps when a packet is received from the PNP. Based on the above description of the transmission direction (from a CNP), given the below description and corresponding portion of the current table, one skilled in the art will be able to implement processing for the receive direction (from a PNP). Hence, the processing direction is described in relatively less detail than the above steps for receiving a packet from the CNP. The functional notation used in this document follows the functional notation described above.

Line 709 is a placeholder indicating that a packet is received from a PNP, such as PNP-120, the packet having a B-DA, B-SA, B-VID, and I-SID.

On line 710, B-COMP-20, similar to line 510, performs a lookup using B-DA and B-VID to produce I-Comp-X2 or TxPort-PNP. Functionally: {B-DA, B-VID}->I-Comp-X2 or TxPort-PNP.

On line 711, if B-DA is I-Comp-X, then I-COMP-X2 performs an FDB lookup using C-DA and I-SID to produce TxPort-CNP. Functionally: {C-DA, I-SID}->TxPort-CNP.

On line 713, if B-DA is I-Comp-X, then I-COMP-X2 performs FDB learning using C-SA and I-SID to learn B-SA and RxPort-PNP. Functionally: {C-SA, I-SID}->B-SA, RxPort-PNP.

On line 715, B-COMP-20 performs learning using B-SA to learn RxPort-PNP. Functionally: B-SA->RxPort-PNP.

When considering the above second and third embodiments, a comparison to conventional implementations highlights the non-obviousness of combining lookups and learning. As described above in reference to FIGS. 1A (and 1B, and 1C), the currently published specifications for MAC-in-MAC encapsulation teach serial lookups and serial learning. The conventional teachings are intuitive for this packet processing, in other words, natural to understand given the communications flow for PBBN. In contrast, the lookups and learning of the current embodiments can be thought of as teaching parallel processing. The conventional, intuitive, serial processing is combined into a single (for each embodiment), parallel processing providing multiple parallel results (outputs) from an innovative combination of inputs and re-structuring of conventional databases.

Figure 6:
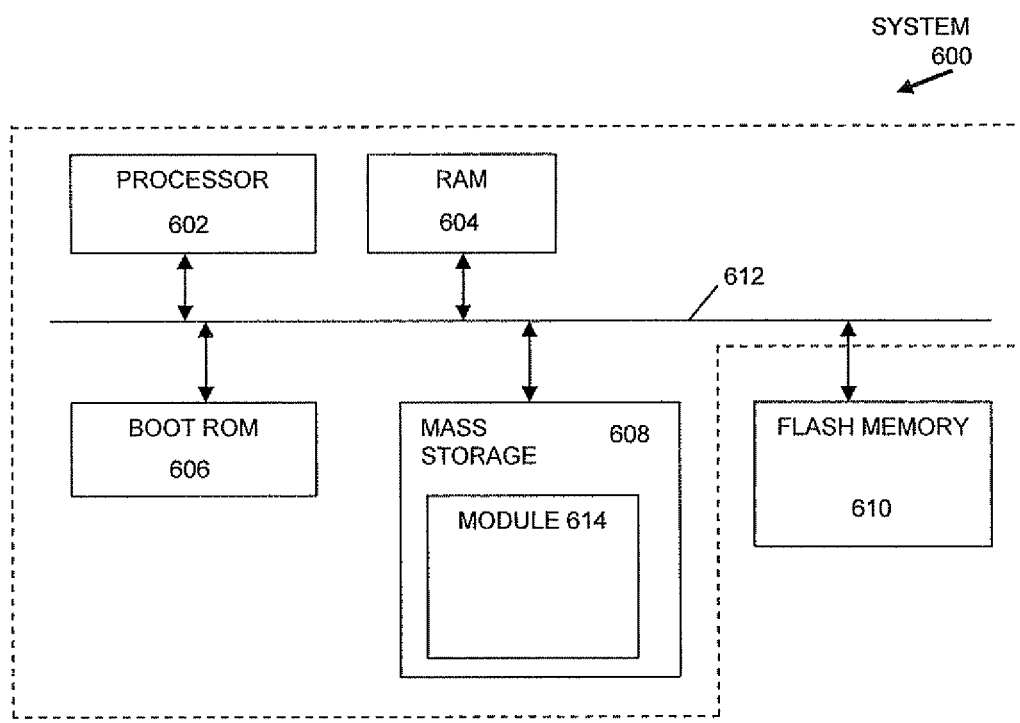
FIG. 6, a high-level block diagram of a processing system 600 for embodiments of the current invention

FIG. 6 is a high-level block diagram of a processing system 600 for embodiments of the current invention. System (processing system) 600 includes a processor 602 and four memory devices: a RAM 604, a boot ROM 606, a mass storage device (hard disk) 608 and a flash memory 610, all communicating via a common bus 612. A module (processing module) 614 is shown on mass storage 608, but as will be obvious to one skilled in the art, could be located on any of the memory devices.

Mass storage device 608 is a non-limiting example of a computer-readable storage medium bearing computer-readable code for implementing the data storage methodology described herein. Other examples of such computer-readable storage media include read-only memories such as CDs bearing such code.

System 600 may have an operating system stored on the memory devices, the ROM may include boot code for the system, and the processor may be configured for executing the boot code to load the operating system to RAM 604, executing the operating system to copy computer-readable code to RAM 604 and execute the code.

The processing blocks of FIGS. 1B, 2A, 3A, and 4A (generally shown as round-corner or snipped-corner boxes, as opposed to data generally shown in parallelograms) can generally be considered modules, or processing modules. Based on this description, one skilled in the art will be able to implement processing modules as computer-readable code, hardware, software, firmware, or other mediums as appropriate for a specific implementation of the current invention.

A database, typically implemented as software running on a processing system, such as on processor 602, is generally computer-readable code for database storage and retrieval on a computer-readable storage medium.

Note that a variety of implementations for modules and processing are possible, depending on the application. Modules are preferably implemented in software, but can also be implemented in hardware and firmware, on a single processor or distributed processors, at one or more locations. The above-described module functions can be combined and implemented as fewer modules or separated into sub-functions and implemented as a larger number of modules. Based on the above description, one skilled in the art will be able to design an implementation for a specific application.

The use of simplified calculations to assist in the description of this embodiment should not detract from the utility and basic advantages of the invention.

It should be noted that the above-described examples, numbers used, and exemplary calculations are to assist in the description of this embodiment. Inadvertent typographical and mathematical errors should not detract from the utility and basic advantages of the invention.

It will be appreciated that the above descriptions are intended only to serve as examples, and that many other embodiments are possible within the scope of the present invention as defined in the appended claims.

What is claimed is:

1. A method of communications at an encapsulating bridge comprising the steps of:
   (a) receiving a packet having an unencapsulated-DA (destination address) and an associated unencapsulated virtual network identifier (service virtual local area network identifier);
   (b) providing, based on said associated unencapsulated virtual network identifier, an associated encapsulation identifier; and
   (c) determining, based on said unencapsulated-DA and said associated encapsulation identifier:
      1) a B-DA (backbone destination address), and 2) a TxPort-PNP (provider network port [PNP] side transmit port), for said packet,
   wherein said determining is done at least in part via less than two lookups to a FDB (forwarding/filtering database).

2. The method of claim 1 wherein said packet is received from an unencapsulated network port and the encapsulating bridge is on an encapsulated network.

3. The method of claim 1 further including determining an encapsulated virtual network identifier from said unencapsulated virtual network identifier.

4. The method of claim 1 further comprising the step of:
(c) learning, based on an unencapsulated source address of said packet and said associated encapsulation identifier, an RxPort-unencapsulated network (unencapsulated network port side receive port) for said packet.

5. The method of claim 1 wherein said receiving is done at an I-Comp (service instance [I] component).

6. The method of claim 1 wherein:
(a) the encapsulating bridge is a BEB (backbone edge bridge);
(b) said unencapsulated-DA is a C-DA (customer destination address);
(c) said associated encapsulation identifier is an I-SID (backbone service instance identifier);
(d) said unencapsulated virtual network identifier being an S-VID (service virtual local area network [VLAN] identifier);
(e) said packet is received from an unencapsulated network port being a CNP (customer network port);
(f) the encapsulating bridge is on an encapsulated network being a PBBN (provider backbone bridged network);
(g) said packet has an encapsulated virtual network identifier being a B-VID (backbone VLAN identifier);
(h) said packet has an unencapsulated source address being a C-SA (customer source address);
(i) said packet has an RxPort-unencapsulated network being an RxPort-CNP (customer network port [CNP] side receive port); and
(j) encapsulation is MAC-in-MAC encapsulation.

7. A system for communications comprising:
(a) a processing system on an encapsulating bridge, said processing system containing a non-transitory computer-readable storage medium bearing computer-readable code for implementing:
(i) receiving a packet having a unencapsulated-DA and an associated unencapsulated virtual network identifier (service virtual local area network identifier);
(ii) providing, based on said associated unencapsulated virtual network identifier, an associated encapsulation identifier; and
(iii) determining, based on said unencapsulated-DA and said associated encapsulation identifier:
1) a B-DA (backbone destination address), and 2) a TxPort-PNP (provider network port [PNP] side transmit port), for said packet,
(b) a FDB (forwarding/filtering database) processing module,
wherein said computer-readable code implements said determining at least in part via less than two lookups to said FDB.

8. The system of claim 7 wherein said packet is received from an unencapsulated network port and said processing system is part of an encapsulating bridge on an encapsulated network.

9. The system of claim 7 wherein said processing system is further configured to: determining an encapsulated virtual network identifier from said unencapsulated virtual network identifier.

10. The system of claim 7 further configured to:
(iii) learn, based on an unencapsulated source address of said packet and said associated encapsulation identifier, an RxPort-unencapsulated network for said packet.

11. The system of claim 7 wherein at least a portion of said processing system is configured on an I-Comp of said encapsulating bridge.

* * * * *